G. W. GWINN.
WEIGHING MECHANISM.
APPLICATION FILED AUG. 23, 1919.
1,425,251.
Patented Aug. 8, 1922.
4 SHEETS—SHEET 1.
Fig. 1,
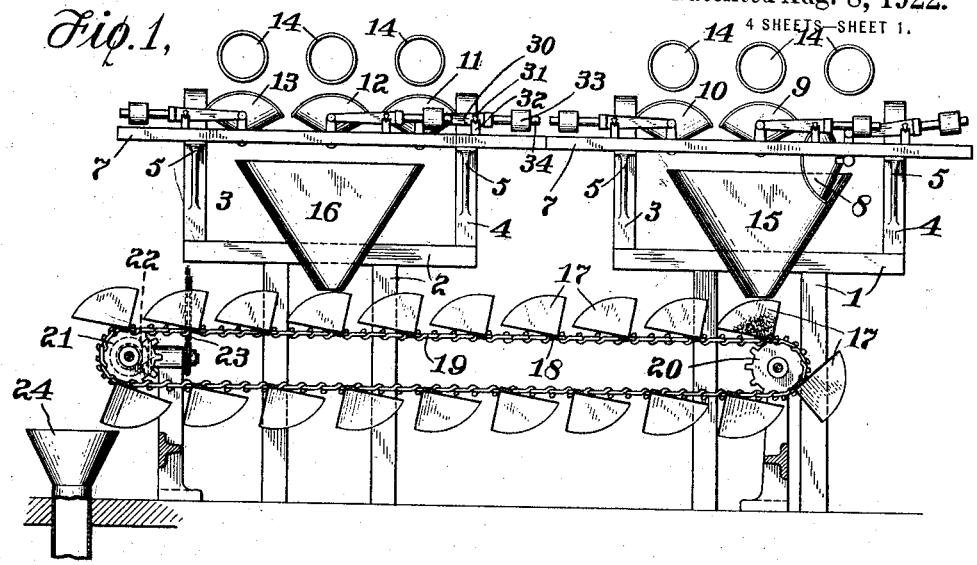
Fig. 2,
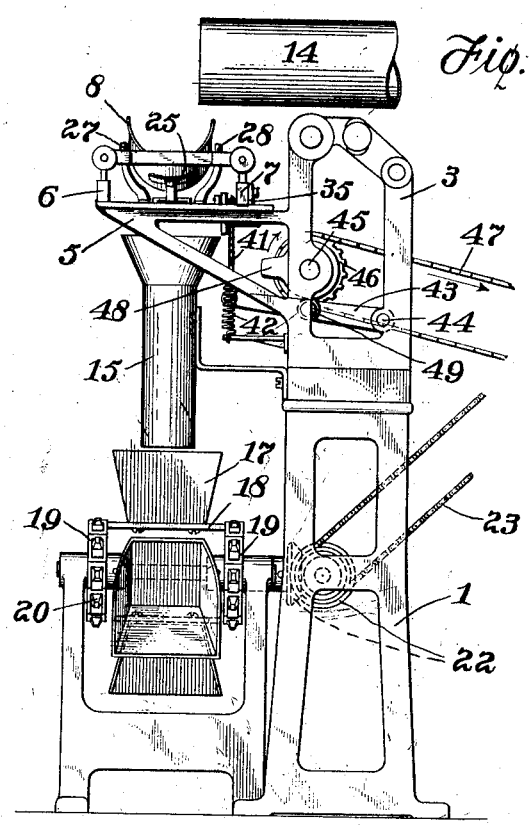
Inventor:
George W. Gwinn,
By his Attorneys

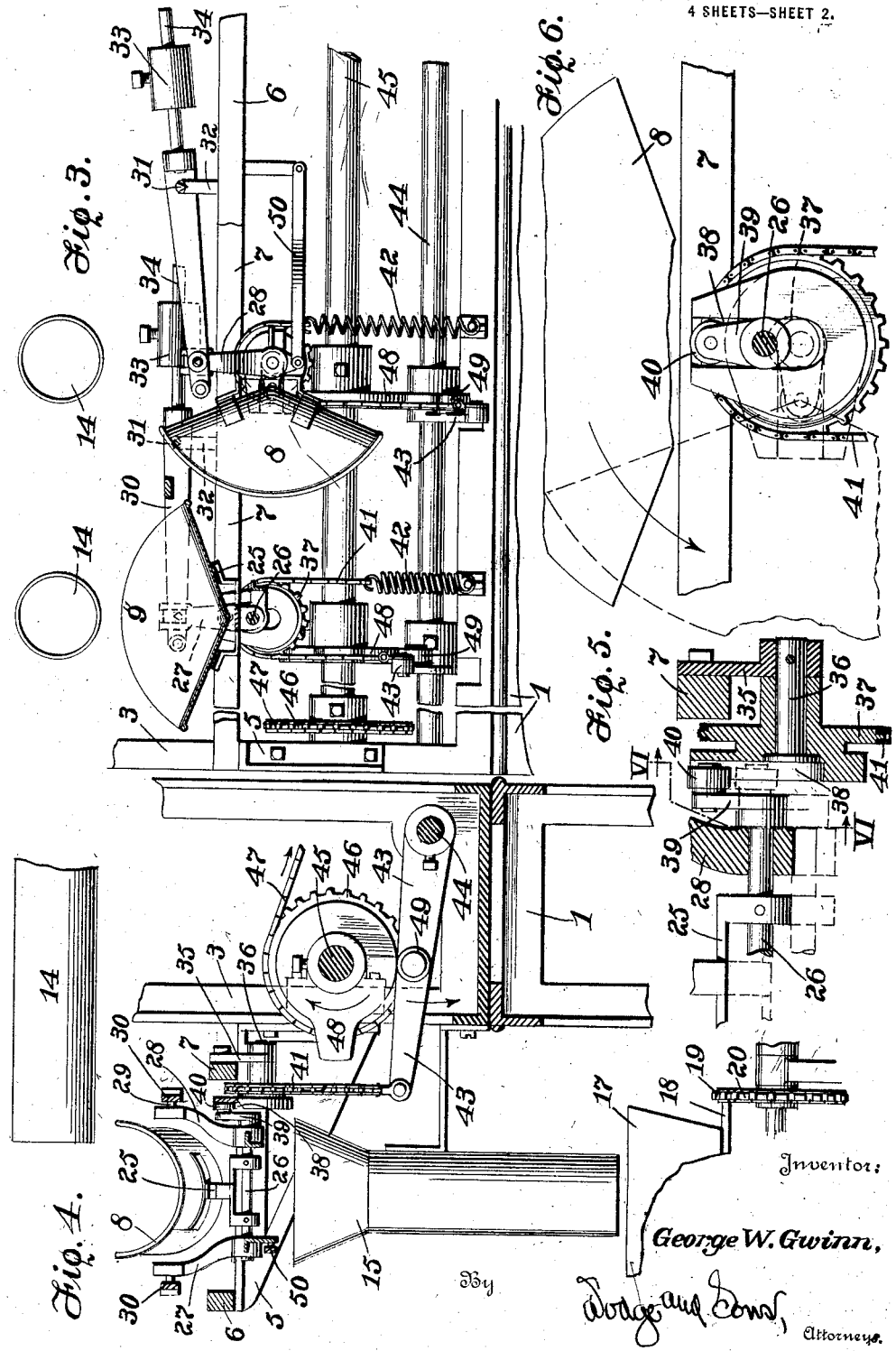

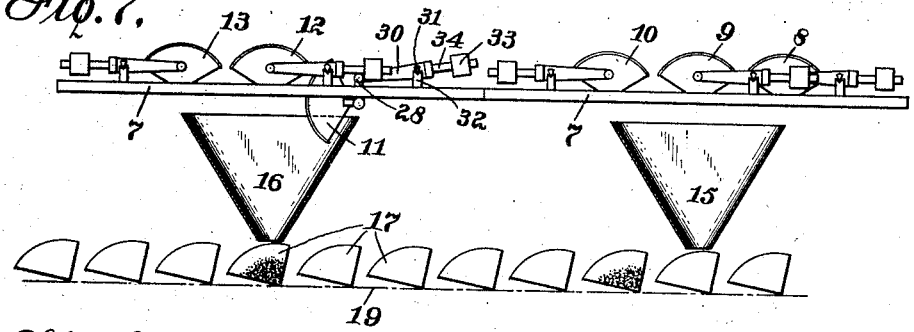
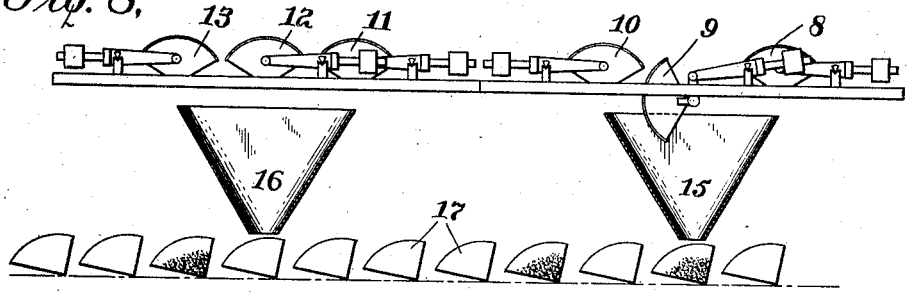
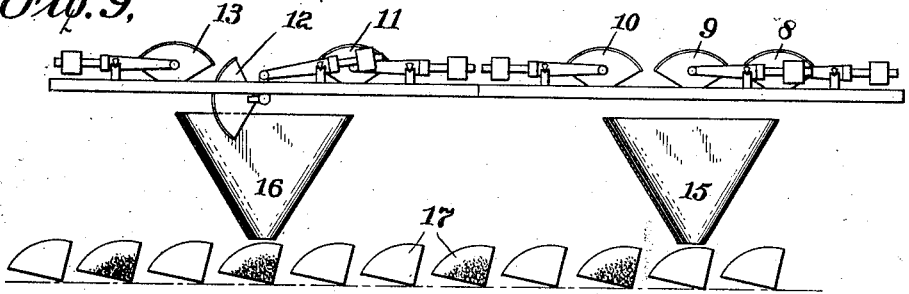
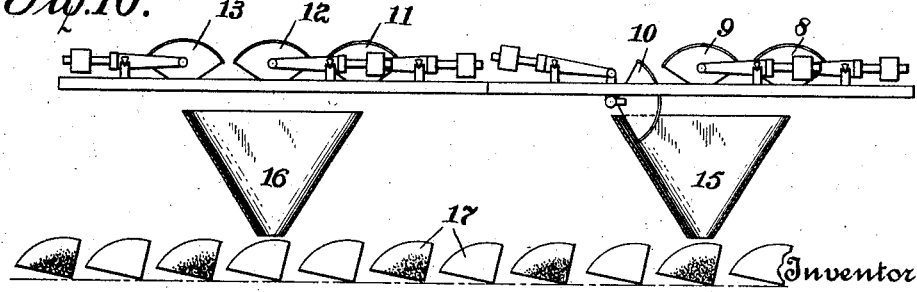

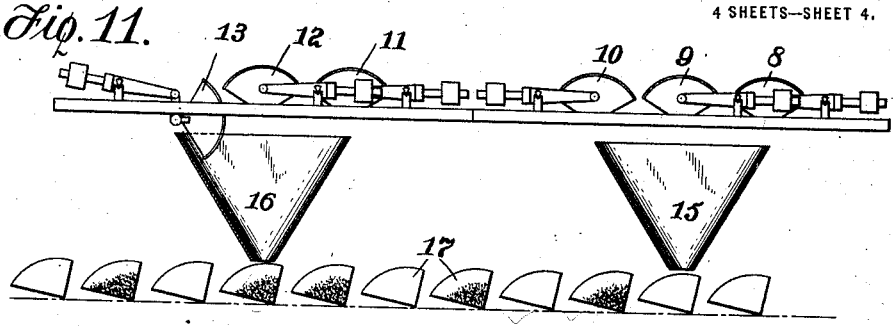
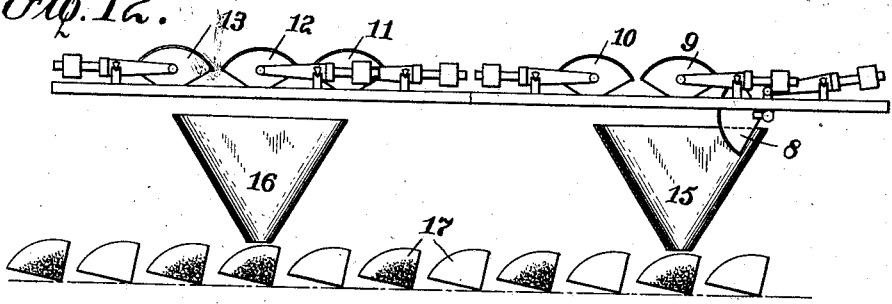
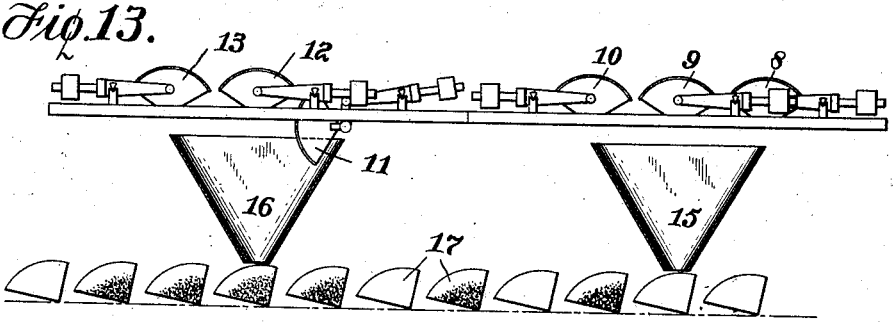
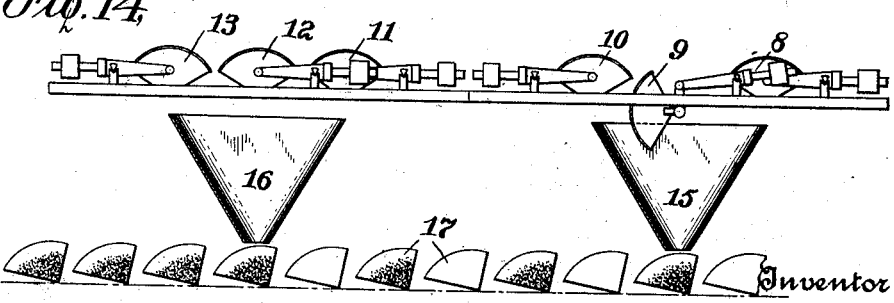

UNITED STATES PATENT OFFICE.

GEORGE W. GWINN, OF EDGEMERE, NEW YORK, ASSIGNOR TO AUTOMATIC PACKING & LABELING COMPANY, OF DURHAM, NORTH CAROLINA, A CORPORATION OF NORTH CAROLINA.

WEIGHING MECHANISM.

1,425,251.  Specification of Letters Patent.  Patented Aug. 8, 1922.

Application filed August 23, 1919. Serial No. 319,403.

*To all whom it may concern:*

Be it known that I, GEORGE W. GWINN, a citizen of the United States, residing at Edgemere, in the county of Queens and State of New York, have invented certain new and useful Improvements in Weighing Mechanism, of which the following is a specification.

This invention pertains to an improved weighing mechanism which is adapted more particularly for use in conjunction with packaging apparatus.

In packaging certain materials it is essential that the charge entering each container be weighed, and with certain classes of materials, owing to their nature, the packaging mechanism may be operated at a speed in excess of that at which the ordinary weighing mechanism may be operated. It is essential, therefore, to provide a special weighing mechanism, which will feed successive charges to the packaging mechanism while the latter is operated at its normal speed and to accurately weigh each of said charges. Accuracy is essential, particularly so where the material, such as tobacco, is put out under a revenue stamp.

One embodiment of the invention is disclosed in the annexed drawings, wherein:

Fig. 1 is a sectional elevation of the mechanism;

Fig. 2 an end elevation thereof;

Fig. 3 a sectional elevation on an enlarged scale showing two of the scale pans and their operative mechanism.

Fig. 4 a transverse vertical sectional view;

Fig. 5 a detail sectional view of the scale dumping mechanism;

Fig. 6 a similar view on the line VI—VI of Fig. 5; and

Figs. 7 to 14 diagrammatic views showing the successive charging of the carriers or receptacles by the scales.

In the drawings I have illustrated two supporting frames 1 and 2, each of which is provided with two uprights or standards 3 and 4 carrying outwardly extending brackets 5. Each pair of brackets form the support for a pair of rails or bars 6, 7, which in turn form the support for the weighing mechanism. There are two series or groups of scales, the pans of one series being denoted by 8, 9 and 10 and those of the second set or series by 11, 12 and 13, respectively. A suitable feed device will be provided for each pan and in the present instance is illustrated as a tube 14 though any suitable means may be employed, the present showing being merely diagrammatic, as such feature forms no part of the present invention.

Located beneath the first series or group of scales is a wide mouth funnel 15 and a similar funnel 16 is located beneath the second group or series. Said funnels discharge into a series of receptacles 17 of any approved shape, the receptacles being attached to cross bars 18 which in turn are connected to two endless chains 19 which pass about sprockets 20 and 21 and thus form an endless carrier having a series of independent receptacles. Motion is imparted to the carrier through gearing 22, (Fig. 2) driven by a sprocket chain 23 which derives power from a suitable source. The motion is continuous and the receptacles 17 pass uninterruptedly beneath the funnels 15 and 16 and discharge into a funnel or hopper 24 (Fig. 1) which directs the material to the packaging mechanism. It is desirable that the scales of each series operate to discharge their contents successively and that the scales of one series or set operate in alternation with those of the other series or set. The weighing mechanism may be of any approved type and each scale is alike in form in so far as its operating mechanism is concerned, hence a description of one will suffice for all. The scale pans, which, as above indicated, are numbered 8 to 13 inclusive. Each pan is mounted upon a bracket or supporting member 25, the lower end of which is bifurcated and is secured to a shaft 26, said shaft being supported by and extending through the lower ends of two arms 27 and 28. Said arms at their upper ends are provided with knife edge bearing elements 29 which are seated in the outer ends of the arms 30 of the scale beam. Said beam is in turn provided with knife edge bearing members 31 which rest upon fixed posts or supporting members 32 extending upwardly from the rails 6 and 7. An adjustable weight 33 is mounted upon the rearwardly extending element 34 of the scale beam and will, of course, be set according to the weight which it is desired the pan should receive. Extending downwardly from the rails 7 (see Figs. 4 and 5) is a bracket 35, in the lower end of which there is secured a stub shaft 36 which forms the support for a combined sprocket wheel 37 and a slotted actuator for the scale, the slot being denoted by 38. Secured to the end of the shaft 26 adjacent said actuator is a crank arm 39 carrying a roller 40, which roller stands in alinement with the slot 38 and is of a size such that it passes freely thereinto and makes contact with the walls of the slot. A sprocket chain 41 passes over the sprocket wheel 37 and at one end has connected thereto a spring 42, the spring tending to rotate the sprocket clockwise and to bring the actuator to the position shown in Figs. 5 and 6. The opposite end of the sprocket chain is connected to the outer end of a lever 43, the lever in turn being sleeved upon a rod 44 between the frame elements 3 and 4. A shaft 45 is likewise mounted between the members 3 and 4, said shaft having secured thereto a sprocket wheel 46 about which passes a sprocket chain 47 which is constantly driven from a suitable source of power, not shown, and in timed relation to the sprocket chain 23 which actuates the endless carrier for the receptacles 17. Said shaft has secured to it a series of cams 48 (see more particularly Figs. 3 and 4) there being one of such cams for each of the scale mechanisms. Said cam is designed to contact a bowl or roller 49 mounted upon the lever 43 so that for each revolution of the shaft 45 the underlying lever 43 will be depressed and the scale pan dumped. There will be an actuating cam, as 48, for each of the scale mechanisms and said cams are spaced about the shaft so that the scales will be dumped one at a time, the scales in one series being dumped successively and the scales of the different series being dumped in alternation.

In operation, as the scale pan fills and descends under the weight of the material, the shaft 26 will be lowered and the roller 40 will pass from the upper part of the slot 38 in the actuating member from the position shown in full lines in Fig. 5 to the position shown in dotted lines in said figure. The scale having received its weight, the cam 48 contacts the roll 49 and depresses the lever 43 thereby drawing down upon the sprocket chain 41, rotating sprocket 37 and stressing spring 42. This movement, of course, dumps the scale pan. As the cam 48 rides off the roll 49 spring 42, through its contraction, rotates the sprocket 37 in the opposite direction and again brings the scale to its horizontal position beneath the feeding element 14. A radius bar 50 will preferably be connected to the lower end of the arm 27 in order to maintain the scale mechanism in its proper position and relation.

Referring now to Fig. 1 the parts are shown in that position where the scale pan 8 of the first series has received its proper weight of material and has been discharged so that the charge of material passes therefrom through the funnel 15 and into the then underlying receptacle 17. The next operation discharges the first scale pan of the second series or group, namely, 11, and the parts are then in the position shown in Fig. 7. The endless conveyor for the receptacles, which is constantly moving, advances the receptacles to the position shown in Fig. 8, and, as will be seen, the receptacle which was previously filled by the pan 8 will have been moved forward two steps so that when the pan 9 has discharged, as indicated in said Fig. 8, it will leave an empty receptacle between the one it fills and the one which was previously filled by the pan 8. This same operation obtains with the scales of the second series or group, as is indicated in Fig. 9, and this operation is continued, as will be seen upon reference to the remaining figures, until all of the scale pans advancing from the last funnel 16 to the point of discharge are filled. Thus it will be seen that the receptacles are filled in alternation by the scales of one group and that the scales of each group or series operate in alternation with those of the other.

It will, of course, be understood that as the pan 12 operates with the receptacles filled, as in Fig. 14, the empty receptacle adjacent the funnel 16, in said figure will have been advanced beneath such funnel to receive the charge from the pan 12 and thus the series of receptacles as they pass from such funnel will be loaded and continue to deliver weighed charges to the hopper 24 which leads to the packaging mechanism. By reason of the fact that the receptacles 17 are open-mouthed or have one end removed, they will automatically discharge themselves into the hopper 24 as they are turned downwardly as the sprocket chains pass about the sprocket wheel adjacent said hopper.

What is claimed is,—

1. In an apparatus for transporting and delivering weighed charges of material, the combination of a plurality of sets of scale pans; a funnel located below each set; a series of receptacles; means for continuously passing said receptacles beneath said funnels; and means for feeding material to said pans and effecting a dumping of the pans of each series successively, the pans of one series operating in alternation with those of the other.

2. In an apparatus for transporting and delivering charges of material, the combination of a plurality of scale pans; a funnel located beneath said pans and into which the material is discharged; a series of receptacles located in line with the funnel and adapted to receive the charges therefrom;

means for continuously moving said receptacles beneath said funnel; and means for alternately dumping said scale pans.

3. In an apparatus for transporting and delivering weighed charges of material, the combination of a plurality of sets of scale pans; a funnel located beneath each set and adapted to receive the weighed charges; a series of receptacles located beneath the funnel; means for moving said receptacles beneath said funnels; and means for alternately dumping material from said scale pans into and through the funnels and into alternate receptacles, as the same are passed beneath the funnels.

4. In an apparatus for transporting and delivering weighed charges of material, the combination of a plurality of sets of scale pans; a funnel located beneath each set of pans; a series of movable receptacles located in line with the funnels; means for moving said receptacles beneath said funnels; means for alternately dumping material from said scale pans into the funnels and consequently into alternate receptacles as the same are passed beneath the funnels; and means for successively discharging said movable receptacles at a single point or terminal.

5. In an apparatus for transporting and delivering weighed charges of material, the combination of a plurality of scale pans; a plurality of funnels; a plurality of receptacles; means for moving said receptacles beneath said funnels; and means for alternately dumping said pans and discharging the material therefrom into the funnels and through the same into the receptacles, said funnels being so arranged to direct one charge only into each of said receptacles.

6. In an apparatus for transporting and delivering weighed charges of material, the combination of two sets of scale pans; a funnel located under each set and adapted to receive the material discharged from the pans; a series of traveling receptacles passing beneath said funnels; and means for successively operating the scale pans of each series and the pans of one series in alternation with those of the other.

7. In an apparatus for transporting and delivering weighed charges of material, the combination of a pair of funnels; a series of traveling receptacles passing beneath said funnels and adapted to receive the material therefrom; a series of scale pans located above each funnel; means for charging each of said pans; and means for serially dumping the pans, a pan in one series operating in alternation with the corresponding pan in the other series whereby but one scale will be discharged at a time and the funnel for each series of scale pans will deliver material into alternate receptacles as they pass beneath such funnels.

8. In an apparatus for transporting and delivering weighed charges of material, the combination of an endless carrier; a series of receptacles attached thereto and movable therewith; a pair of funnels; and weighing mechanism for the material free of any operative connection with the receptacles adapted to discharge into each of said funnels and to deliver the material alternately from each funnel into alternate receptacles, the receptacles filled by one funnel being in alternation with those of the other.

In testimony whereof I have signed my name to this specification.

GEORGE W. GWINN.